UNITED STATES PATENT OFFICE 2,217,030

SUBSTITUTED TRIAZINES

John Kenson Simons, Dormont, Pa., assignor to Plaskon Company, Inc., Toledo, Ohio, a corporation of Delaware No Drawing. Application February 14, 1939,
Serial No. 256,309

1 Claim. (Cl. 260—248)

This invention relates to novel carbon compounds, and in particular to novel substituted triazines that are capable of reacting with aldehydes to from synthetic resins.

Biguanide

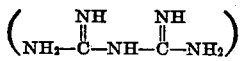

does not react with formaldehyde to form a resin. The present invention arose from the discovery that substituted- and unsubstituted-phenyl. biguanides react with aldehydes to form intermediate reaction products that are capable of conversion by heat into infusible resins, and from the further discovery that more stable and resistant resins result if the phenyl biguanides are subjected to a "ring-closing" reaction and are then reacted with the aldehydes.

The novel carbon compounds of the present invention are the compounds that can be prepared by subjecting substituted- and unsubstituted-phenyl biguanides to a "ring-closing" reaction, and they are highly useful for the preparation of infusible synthetic resins. They are biguanide derivatives, and it is not understood why they behave in an entirely different manner from biguanide when they are treated with aldehydes.

The principal object of the invention is to provide novel substituted triazines of great utility. More specific objects and advantages are apparent from the description, which merely discloses and illustrates the invention and is not intended to impose limitations upon the claims.

The novel carbon compounds of the invention are believed to be 1-phenyl-2,4-diimino-1,2,3,4-tetrahydro-1,3,5-triazines, in which the phenyl is substituted or unsubstituted

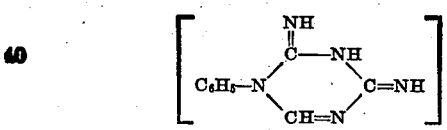

These compounds are preferably prepared by reacting ethyl formate with the corresponding substituted- or unsubstituted-phenyl biguanide

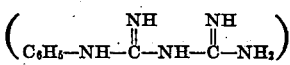

The 1-phenyl-2,4-diimino - 1,2,3,4 - tetrahydro-1,3,5-triazine is believed to be tautomeric with the 1-phenyl-2-imino-4 - amino - 1,2 - dihydro-1,3,5-triazine

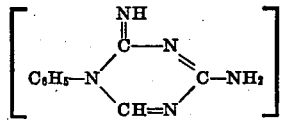

Substituted- and unsubstituted-phenyl biguanides may be prepared as follows: 1 mol of hydrochloric acid is added to 1 mol of aniline or a substituted aniline, in about 300 c.c. of water. 1 mol of dicyandiamide is then added and the mixture is refluxed for 1 to 3 hours. When the solution is cooled, a 60 to 80% yield of the substituted- or unsubstituted-phenyl biguanide hydrochloride is obtained. The hydrochloride is then dissolved in 5 to 10 times its weight of hot water, and an equivalent amount of sodium hydroxide in aqueous solution is added to precipitate the substituted biguanide.

The "ring-closing" reaction may be conducted as follows: A sufficient amount of absolute alcohol is added to 1 mol of the substituted- or unsubstituted-phenyl biguanide to dissolve it at 50° C., and 1 mol of ethyl formate is added to the warm solution. The solution is refluxed for 30 minutes and then cooled to separate the triazine. A yield of 40 to 80 per cent can be obtained. Examples of substituted biguanides that may be used in the foregoing reaction are phenyl biguanide, o-tolyl biguanide, p-tolyl biguanide, p-phenetyl biguanide, o-anisyl biguanide and o-chlorophenyl biguanide. The corresponding products that are obtained, which are believed to be 1 - aryl-2,4-diimino-1,2,3,4-tetrahydro-1,3,5-triazines, have the following melting points: 231–2° C. for the phenyl, 159–61° C. for the o-tolyl, 227–8° C. for the p-tolyl, 195–6° C. for the p-phenetyl, 181–2° C. for the o-anisyl and 148–9° C. for the o-chlorophenyl.

The embodiments of the invention that have been described may be modified to meet various requirements.

Having described my invention, I claim:

A novel carbon compound formed by the reaction of ethyl formate with a substance selected from the group consisting of unsubstituted-phenyl biguanide, and substituted-phenyl biguanide in which the substituent is a member of the group consisting of alkyl, alkoxy and halogen.

JOHN KENSON SIMONS.